(12) United States Patent
Parker et al.

(10) Patent No.: US 9,401,962 B2
(45) Date of Patent: Jul. 26, 2016

(54) TRAFFIC STEERING SYSTEM

(75) Inventors: Benjamin J. Parker, Vacaville, CA (US); Samir Ait-Ameur, Fremont, CA (US); Emerando M. Delos Reyes, Pleasant Hill, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1285 days.

(21) Appl. No.: 12/913,823

(22) Filed: Oct. 28, 2010

(65) Prior Publication Data

US 2012/0110641 A1    May 3, 2012

(51) Int. Cl.
  *H04L 29/06* (2006.01)
  *H04L 29/08* (2006.01)
  *H04L 12/721* (2013.01)

(52) U.S. Cl.
  CPC .............. *H04L 67/141* (2013.01); *H04L 45/06* (2013.01); *H04L 63/1441* (2013.01); *H04L 67/306* (2013.01); *H04L 67/327* (2013.01)

(58) Field of Classification Search
  USPC ............................................................ 726/4
  See application file for complete search history.

(56) References Cited

U.S. PATENT DOCUMENTS

| | | | | |
|---|---|---|---|---|
| 7,293,109 | B2* | 11/2007 | Ott et al. | 709/249 |
| 7,512,678 | B2* | 3/2009 | Crabtree et al. | 709/224 |
| 8,385,901 | B2* | 2/2013 | Featherstone et al. | 455/418 |
| 8,955,112 | B2* | 2/2015 | Nguyen | H04L 45/306 726/22 |
| 2003/0076816 | A1* | 4/2003 | Naranjo et al. | 370/352 |
| 2004/0044789 | A1* | 3/2004 | Angel et al. | 709/238 |
| 2004/0162068 | A1* | 8/2004 | Lamb et al. | 455/432.1 |
| 2005/0143067 | A1* | 6/2005 | Van Do | G06F 17/30867 455/432.3 |
| 2006/0265397 | A1* | 11/2006 | Bryan | G06F 17/3089 |
| 2009/0245240 | A1* | 10/2009 | Mao et al. | 370/352 |
| 2013/0239169 | A1* | 9/2013 | Nakhjiri | H04L 63/20 726/1 |

FOREIGN PATENT DOCUMENTS

| | | | |
|---|---|---|---|
| EP | 1848163 A1 | * | 10/2007 |
| EP | 2222067 A1 | * | 8/2010 |
| WO | WO 0186494 | * | 11/2001 |

* cited by examiner

*Primary Examiner* — Christopher Revak (57) ABSTRACT

A method including receiving a session request to establish a network connection with a network; sending a session response to establish the network connection with the network; obtaining, by a traffic steering system, user profile information associated with a user sending the session request; and routing the network connection to a requested user destination via the traffic steering system based on the user profile information, wherein the user profile information includes user-specific preferences.

20 Claims, 10 Drawing Sheets

TRAFFIC STEERING SYSTEM

BACKGROUND

Network providers (NPs) and service providers (SPs) are continuing to strive toward enhancing their users' experience. For example, various communication standards and network architectures are being developed to provide users with improved Quality of Service (QoS).

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

According to exemplary embodiments, a traffic steering system (TSS) may provide customized routing, as well as other services, regardless of the access technology (e.g., wireless, wired, Long Term Evolution, Data Over Cable Service Interface Specification (DOCSIS), WiFi, FiOS, etc.) or service type (e.g., phone, television, Internet, etc.) based on user profile information. The term "user profile information," as used herein, is intended to be broadly interpreted to include, for example, information relating to a service provided to the user by a service provider (e.g., types of service, level of service, etc.), user-specific preferences (e.g., content filtering, selection of a device to which messages may be routed, security preferences, messaging preferences (e.g., e-mail preferences, instant messaging preferences, etc.), service provider preferences, (e.g., preferences pertaining to a particular service accessed, used, etc, by a user, etc.), etc.), user registration credentials, usage behavior (e.g., browsing history, location history, contact lists, call history, etc.), user device information, etc.

In contrast to other approaches, the TSS may, among other things, provide the user with customized services that may be user-specific versus specific to a group of users (e.g., levels of service, etc.). Additionally, the TSS may be able to provide various types of services and/or integrate with other services (e.g., Internet services, non-Internet services, etc.) based on its use of various types of information, such as, the user profile information, general routing domain information, network address translation (NAT) information (e.g., private Internet Protocol address, public IP address, etc.), network attributes (e.g., policies, etc.) etc. For example, the TSS may be able to route user traffic to a network service while taking into account the user profile information and/or other types of information (e.g., NAT information, general routing domain information, etc.). As an example, if the user subscribes to content filtering and anti-virus services, and the user also wants all Simple Messaging Service (SMS) messages to be received as Instant Messages (IMs), such services may be provided, in combination, or not, based on the TSS.

According to an exemplary embodiment, the TSS may include a system that is network agnostic. For example, the TSS may support multiple communication standards (e.g., $2^{nd}$ Generation (2G) networks, $3^{rd}$ Generation (3G) networks, $4^{th}$ Generation (4G) networks, etc.), multiple protocols (e.g., IP, etc.), and access technologies (wired, wireless).

According to an exemplary embodiment, the TSS may include a device-agnostic client application that may be installed on user devices. For example, versions of the client application may be installed on handheld/mobile devices (e.g., wireless telephones, personal digital assistants (PDAs), etc.), stationary devices (e.g., desktop computers, set top boxes, etc.), or other types of user devices. The client application may operate regardless of the type of access to a network. According to an exemplary embodiment, the client application may instantiate a communication path (e.g. a tunnel, etc.) with the network-side of the TSS. The client application may also authenticate the user onto the network. When the user is authenticated, the user may receive TSS services. Additionally, the client application may also test round-trip latency using, for example, the Network Time Protocol (NTP), throughput, and/or other performance metrics. For example, the client application may download a file (e.g., periodically) and performance during the download may serve as a basis for the metrics.

According to an exemplary embodiment, the TSS may proxy registration credentials for providing single sign-on services to various service providers (e.g., application service providers (ASPs), such as, for example, Facebook, LinkedIn, Google Apps, etc.) based on user profile information. For example, the user profile information may specify certain web pages that the user often visits. Additionally, the TSS may proxy registration credentials to more secure partners, such as, for example, financial institutions. For example, when the user places a call with his/her bank, the TSS may pass credentials to the bank as part of the call setup. Additionally, according to an exemplary embodiment, the TSS may provide data manipulation (e.g., header manipulation, etc.) to transparently embed authentication information for consumption by a service provider (SP) or other destination.

According to an exemplary embodiment, the TSS may couple an Electronic Number Mapping System (ENUM) with a Domain Name System (DNS) to provide a user with relevant web pages when the user places a call. Additionally, for example, as Web 3.0, Hypertext Markup Language 5 (HTML5), etc., provide web pages that offer embedded voice services, the TSS may provide a find-me, follow me service. By way of example, the TSS may receive updates to a Uniform Resource Identifier (URI), which may be mapped to a domain name (e.g., associated with switches), to allow voice services to be routed to the user. Additionally, the TSS may store URIs for various SPs that offer embedded voice services. In this way, the TSS may provide a find-me, follow-me service even if the voice service originates from another service provider.

According to an exemplary embodiment, the TSS may obtain the user's location through various methods (e.g., reverse Internet Protocol (IP) lookup, a location-based system, via the client application on the user device, etc.). For example, when the user is authenticated via the client application, the user's location may be determined. The TSS may also determine the current domain of the user. The TSS may then use this information to establish routing metrics/routing strategies. For example, with respect to Over-The-Top (OTT) voice services, the TSS may evaluate the domain of the URI to determine the most appropriate gateway from the SP network to the OTT provider network. According to this example, the TSS may use one or more performance metrics, such as, hop count, transit network connectivity, latency, jitter, as well as routing strategies (e.g., hot potato routing, etc.) to maximize QoS. The TSS may use various protocols (e.g., Real Time Streaming Protocol (RTSP), etc.) and/or methods to evaluate performance metrics, etc.

According to an exemplary embodiment, the TSS may also perform call forwarding to a communication service that may be different from the communication service with which the call originated. By way of example, it may be assumed that a Private Branch Exchange (PBX) of a company A, for which a user works, registers with the TSS. It may be assumed that the TSS may be associated with the user's SP. According to an exemplary scenario, the user may receive a call at work via the PBX of company A on his/her desk phone. The PBX may communicate with the TSS to forward the call. The TSS may locate the user (e.g., via the client application) and forward the call to the user. For example, the TSS may forward the call to the user's wireless phone, regardless of the wireless SP being used. According to another embodiment, the client application on the user device may be used to authenticate into company A's PBX to provide a virtual link to the PBX. The client application may also take over the dialer (e.g., on the phone or soft client) to make the PBX's features available to the user.

According to an exemplary embodiment, the above-mentioned forwarding service may be extended to other types of communication services, such as, for example, SMS messages, Multimedia Messaging Service (MMS) messages, IM messages, e-mail, etc. The term "message," as used herein, is intended to be broadly interpreted to include, for example, a form of communication. For example, a message may include an SMS message, an MMS message, an IM message, an email, a telephone call, a facsimile, a video chat, or some other communication activity.

According to such embodiments, messages may be sent to any device with which the user may be registered. For example, if the user wishes to receive SMS messages and/or MMS messages on his/her desktop computer, then when the client application of the desktop computer is registered with the TSS, the TSS may deliver such messages to the user-preferred device. According to an embodiment, the TSS may forward the messages to another type of destination (e.g., web sites (e.g., post to Facebook, etc.), etc.).

Additionally, according an exemplary embodiment, the TSS may analyze a user's message usage/message history. The TSS may use other types of information, such as, for example, contact lists, browsing history, etc., to provide these types of services. Based on this information, the TSS may recognize a communication pattern between the user and other users and assist in the development of such a relationship. For example, the TSS may invite the user to extend his/her LinkedIn profile, Facebook page, other types of social networking services, etc., to the other users. The TSS may coordinate the sharing of the user's LinkedIn profile, Facebook page, etc., with the other users based on the user's acceptance. Additionally, or alternatively, the TSS may offer service suggestions (e.g., offers of service plans, offers of products, etc.) that may optimize the user's experience (e.g., monetarily, service-wise, etc.) based on the user's message usage/message history. By way of example, the user may make frequent calls on his/her mobile phone. The SP associated with the TSS may offer the user a different service (e.g., Internet access to make Internet calls, etc.) that may result in a savings to the user without sacrificing service, etc. The TSS may provide the user with a service offer, and upon acceptance by the user, the TSS may manage the appropriate data (e.g., contact lists, etc.) so that the user's transition is seamless.

According to an exemplary embodiment, the TSS may store the browser history of the user. The TSS may use statistical analysis to derive user-behavior patterns to offer value-added services. For example, the TSS may offer the user to automatically sign-on to web sites, automatically add an HTML5 voice service, etc. According to an exemplary embodiment, the user may be identified by various data, credentials, etc. For example, the user may be identified based on one or more of the following, such as, single-sign-on credentials, an International Mobile Subscriber Identity (IMSI), an International Mobile Equipment Identity (IMEI), Mobile Directory Number (MDN), Mobile Station International Subscriber Directory Number (MSISDN), etc. Additionally, for example, other data may be obtained, such as data stored on a Subscriber Identity Module (SIM) card or elsewhere, such as, contacts lists, SMS messages, MMS messages, MMS metadata, web browsing history, call history, etc.

According to an exemplary embodiment, as previously described, the TSS may route messages based on the user's current location. For example, the TSS may update a Voice-over Internet Protocol (VoIP) domain based on the user's current location. Additionally, according to an exemplary embodiment, the TSS may send advertisements to the user based on the user's current location and usage history. By way of example, if the user is located near a particular store, the TSS may send to the user advertisements (e.g., discounts, coupons, etc.) related to the store or may send advertisements related to stores in the vicinity of the user. Additionally, if the user visits this particular store often, then the TSS may recognize the user's patronage to the particular store and send advertisements related to the store or send advertisements related to stores in the vicinity of the particular store. As an example, the advertisements may originate from marketing ad agencies, stores, etc., which may be partnered with a service provider. Additionally, according to an exemplary embodiment, location-based services may be hidden from other providers based on a user's preferences.

As previously described, according to an exemplary embodiment, the TSS may, among other services, custom route messages based on user profile information.

Figure 1A:
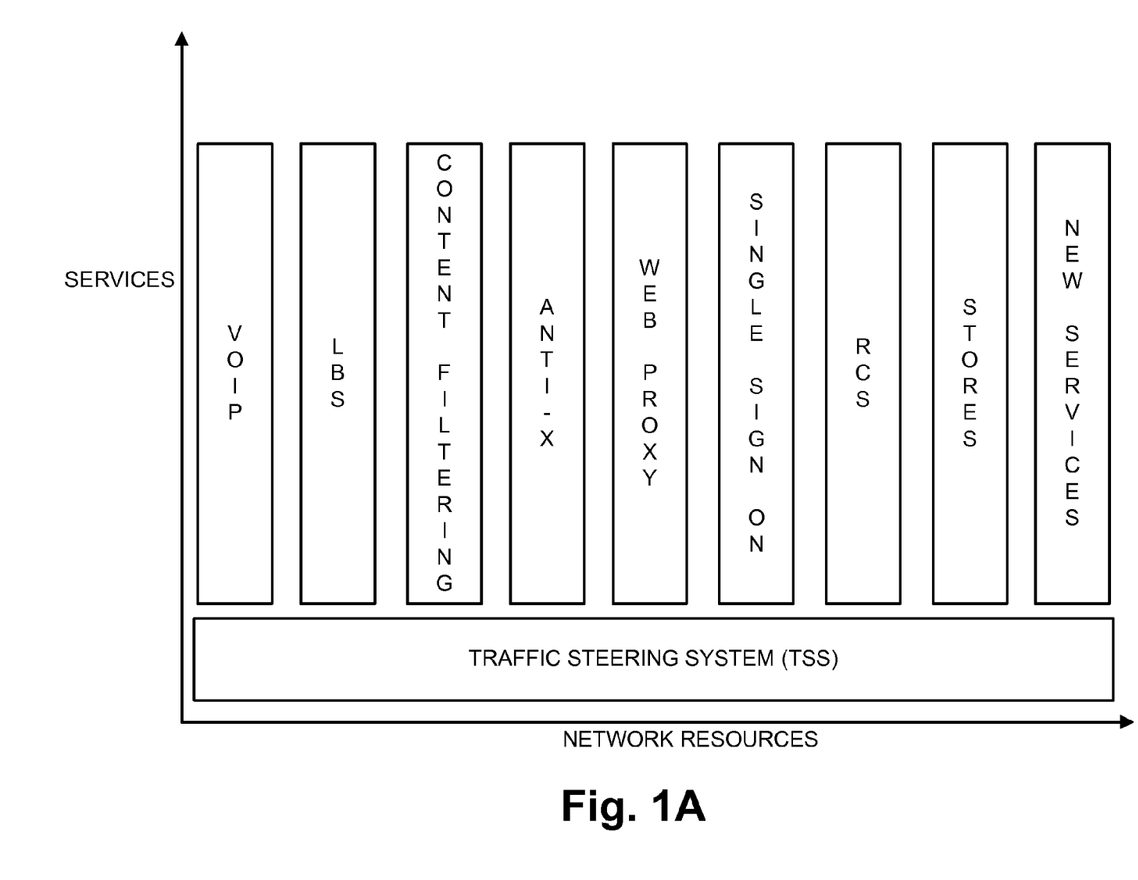
FIG. 1A is a diagram illustrating an exemplary framework of a traffic steering system (TSS)

FIG. 1A is a diagram illustrating an exemplary framework of the TSS. As illustrated, according to an exemplary embodiment, the TSS may provide a common platform for various services, such as, for example, voice services (e.g., VoIP, etc.), location-based services (LBSs), content filtering services, security services (e.g., anti-virus, anti-spam, etc.), web proxy services, single sign-on services, rich communication services, store services, new services, etc.

According to an exemplary embodiment, the TSS may be implemented as a grid computing platform. According to other exemplary embodiments, the TSS may be implemented as another type of (distributed) architecture/infrastructure. According to an exemplary embodiment, the TSS may act as point of integration into or out of a service provider network. For example, all traffic in and out of the service provider network may pass through the TSS.

Additionally, according to an exemplary embodiment, the TSS may include a failover system to manage outages, failures, upgrades, etc. By way of example, the TSS may maintain a hash table amongst all constituents in a failover domain. In the event of a failure, etc., associated with a network device, a neighbor device may take over. According to an exemplary embodiment, the TSS may also allocate computational, storage, and/or other types of resource based on the time of day, demand, etc.

According to an exemplary embodiment, the TSS may also provide security services on behalf of the user and/or a service provider. The TSS may be responsive to security alerts either triggered by the TSS or triggered by a separate security system. The service provider may govern the security policies enforced by or recognized by the TSS via various network devices, such as, for example, the Policy Charging and Rules Function (PCRF), an Element Management System (EMS), etc.

According to an exemplary embodiment, the TSS may recognize various security threats, attacks, and/or user violations, such as, for example, excessive bandwidth consumption, denial-of-service (DoS) attacks (e.g., a User Datagram Protocol (UDP) flood, a Transmission Control Protocol (TCP) SYN flood, a Christmas Tree attack, etc.), excessive domain name system (DNS) queries (e.g., queries/second (QPS) limit exceeded), distributed DoS attacks, etc.

According to an exemplary embodiment, the TSS may respond to these various security threats, attacks, and/or user violations, in a number of ways, such as for example, route the traffic to a black hole, rate limit the user, route the user's web queries to a specific web page, and/or block traffic altogether. Additionally, or alternatively, the TSS may send security-related information to various security systems and/or surveillance tools that the service provider may use. For example, if the user commits a security violation, or an attack occurs, the TSS may recognize the violation or the attack and alert appropriate security devices, security centers, etc.

Further, a service provider may manage and maintain a user's security requirements even when the user may not be using the service provider's network and/or a service offered by the service provider.

Figure 1B:
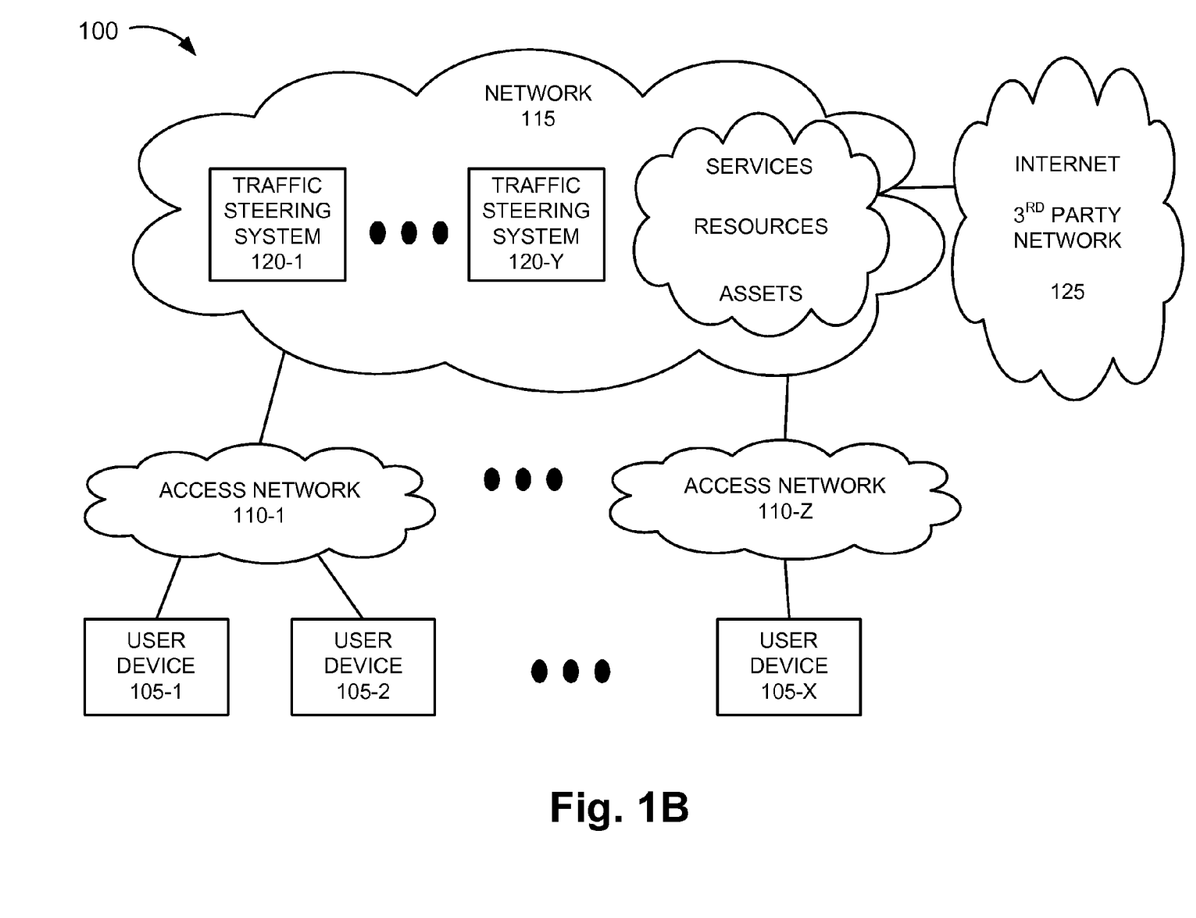
FIG. 1B is a diagram illustrating an exemplary environment in which an exemplary embodiment for the TSS may be implemented.

FIG. 1B is a diagram illustrating an exemplary environment 100 in which an exemplary embodiment for the TSS may be implemented. As illustrated in FIG. 1B, environment 100 may include user devices 105-1 through 105-X (referred to generally as user devices 105 or user device 105), access networks 110-1 through 110-Z (referred to generally as access networks 110 or access network 110), and network 115 that includes TSS devices 120-1 through 120-Y (referred to generally as TSS 120).

The number of devices and configuration in environment 100 is exemplary and provided for simplicity. In practice, environment 100 may include additional devices, fewer devices, different devices, and/or differently arranged devices, than those illustrated in FIG. 1B. Additionally, or alternatively, environment 100 may include additional networks, fewer networks, and/or differently arranged networks, than those illustrated in FIG. 1B. Also, one or more functions and/or processes described as being performed by a particular device may be performed by a different device, or some combination of devices, according to other embodiments. Environment 100 may include wired and/or wireless connections among the devices illustrated.

User device 105 may include, for example, a mobile device, a stationary device, a handheld device, a wrist-worn device, a tablet device, or a portable device. For example, user device 105 may include a computational device (e.g., a desktop computer, a laptop computer, a palmtop computer, etc.), a communication device (e.g., a wireless phone, a wired phone, an Internet-access device, etc.), a gaming device, a location-aware device, a multimedia device (e.g., a music playing device, a video playing device, etc.), a data organizing device (e.g., a personal digital assistant (PDA), etc.), and/or some other type of user device (e.g., a kiosk device, etc.). According to an exemplary embodiment, user device 105 may include the client application.

Access network 110 may include, for example, one or multiple networks of any type that provide access to services, resources, and/or assets. Access network 110 may correspond to a satellite-based network, a terrestrial network, a wireless network and/or a wired network. Access network 110 may operate according to one or multiple wireless and/or wired technologies, communication standards, protocols, etc.

Network 115 may include, for example, one or multiple networks of any type that provide services, resources, and/or assets. Network 115 may correspond to a satellite-based network, a terrestrial network, a wireless network, and/or a wired network. Network 115 may operate according to one or multiple wireless and/or wired technologies, communication standards, protocols, etc. Network 115 may provide various services, resources, assets, etc.

TSS 120 may include network devices that provide traffic steering services, as well as other types of services described herein. By way of example, TSS 120 may be implemented by network devices, such as, a server device, a proxy device, a routing device, a peer device, a gateway device, a security device, a virtual private network (VPN) concentrator device, a network computer, etc. Depending on the type of network in which TSS 120 may be incorporated, TSS 120 may integrate with network devices, such as, for example, a Home Agent (HA), a Packet Data Network Gateway (PGW), a Home Subscriber System (HSS), a Gateway GPRS Support Node (GGSN), Authentication, Authorization, and Accounting server (AAA), a Policy Charging and Rules Function (PCRF), data centers, etc. TSS 120 may include appropriate interfaces to communicate with other network devices, etc.

As previously described, according to an exemplary embodiment, TSS 120 may act as point of integration into or out of a network (e.g., network 115). For example, all traffic in and out of network 115 may pass through TSS 120. According to other embodiments, some traffic may not pass through TSS 120. For example, a service provider and/or a network operator may determine that TSS services may not be necessary for a particular service, particular users, particular sources, particular destinations, etc.

Internet/$3^{rd}$ party network 125 may include one or multiple networks of any type that provide various services, resources, assets, etc.

Figure 1C:
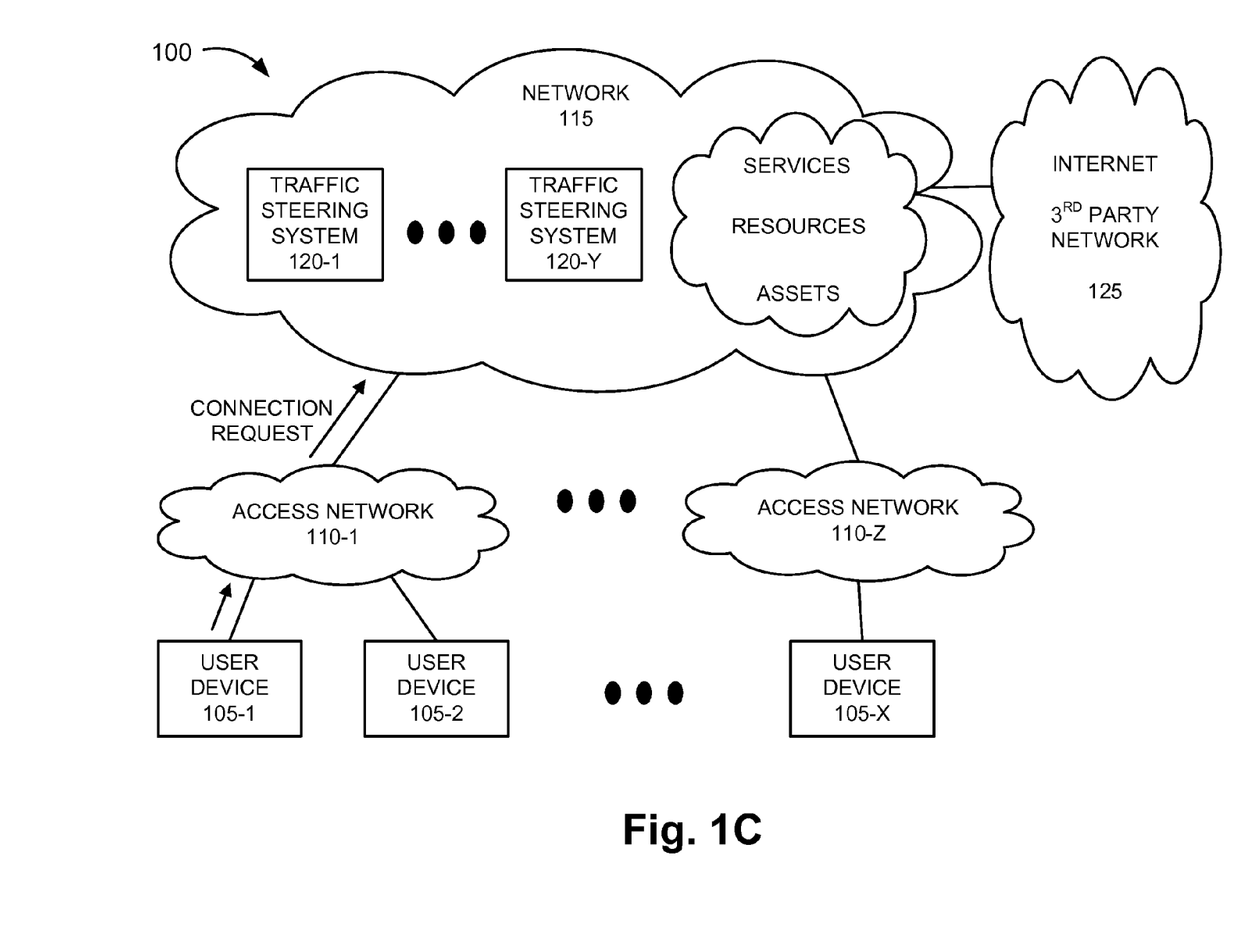
FIGS. 1C-1F are diagrams illustrating an exemplary process for providing TSS services.
Figure 1D:
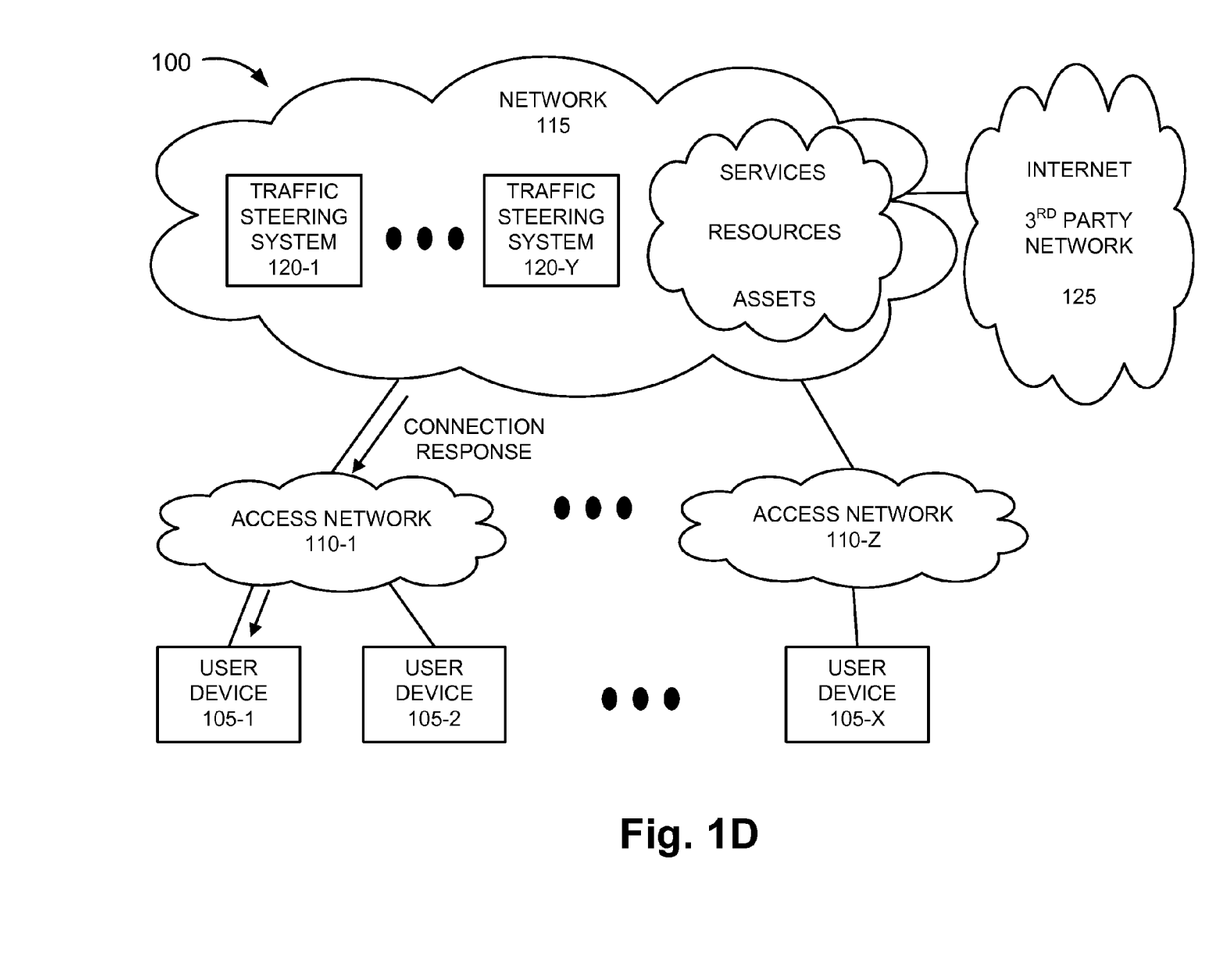

FIGS. 1C-1F are diagrams illustrating an exemplary process for providing TSS services. As illustrated in FIG. 1C, user device 105-1 may send a connection request to network 115 via access network 110-1. For example, a client application residing on user device 105-1 may communicate with network 115. The client application may authenticate the user (not illustrated) with network 115 and/or TSS 120. Referring to FIG. 1D, network 115 may send a connection response to user device 105-1.

Figure 1E:
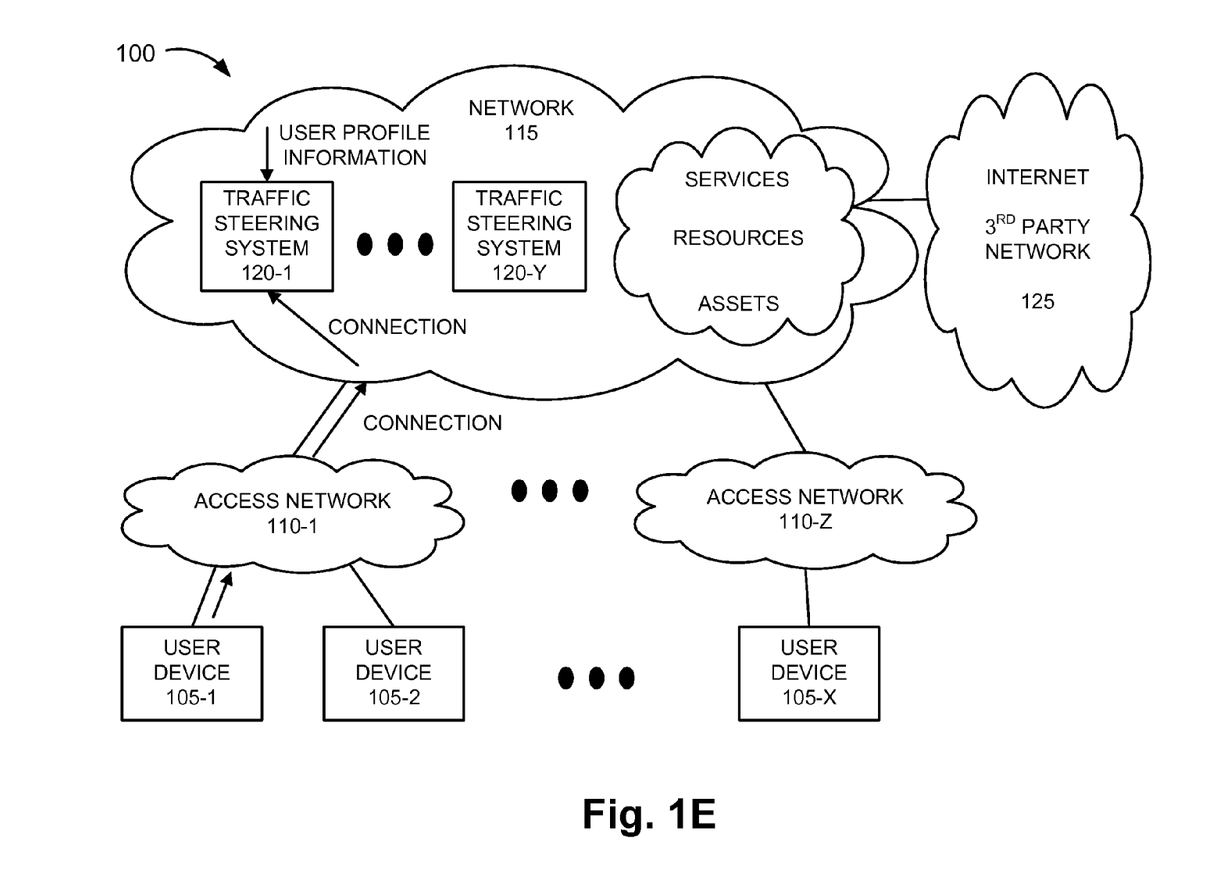
Figure 1F:
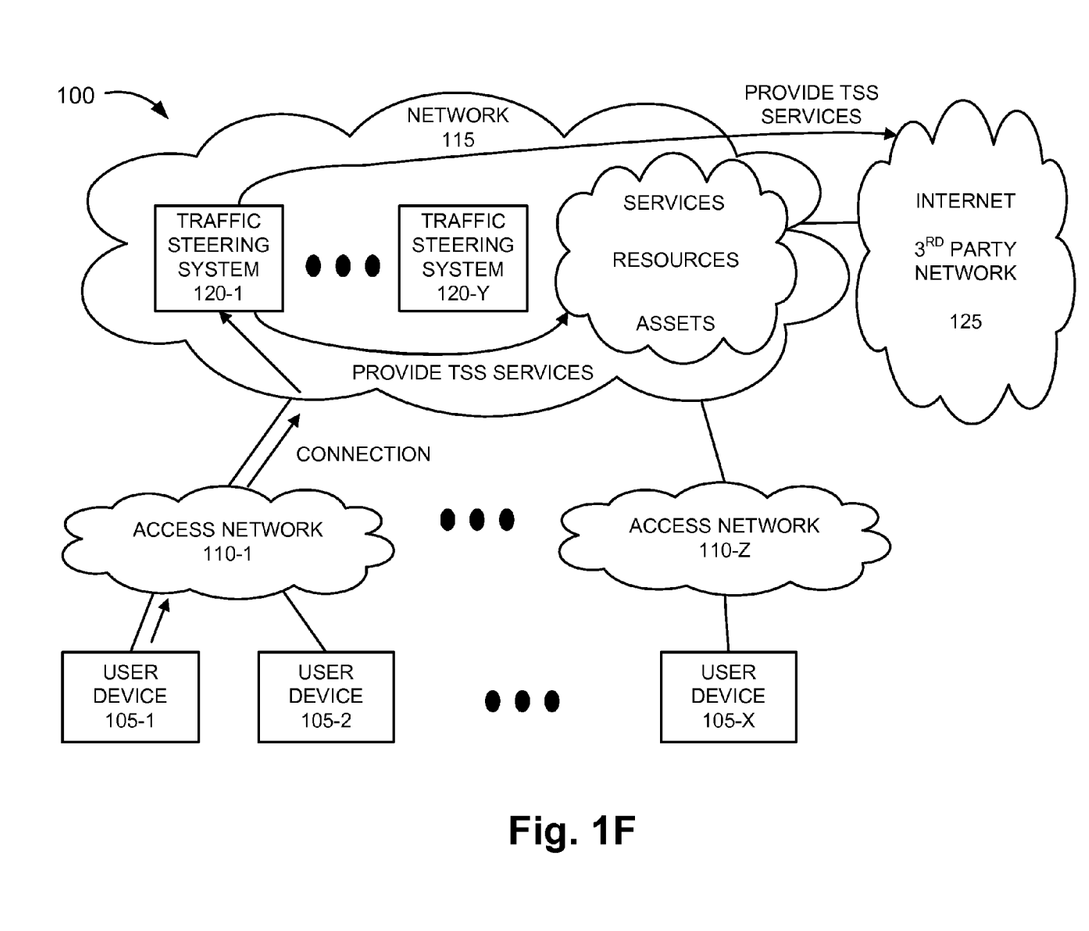

As illustrated in FIG. 1E, the connection may pass through TSS 120. In this example, TSS 120 may receive user profile information from another network device (e.g., an HA, an HSS, etc.) not illustrated. Depending on the service, resource, asset, etc., relating to the connection, the type of user profile information may be different. As illustrated in FIG. 1F, TSS 120 may provide TSS services, as previously described, based on the user profile information. For example, TSS 120 may route the connection to services, resources, assets, etc., in network 115 or to Internet/3$^{rd}$ party network 125 based on the user profile information. In this regard, network 115 (e.g., TSS 120) may provide the user with TSS services whether the user uses services in network 115 or elsewhere.

Figure 2:
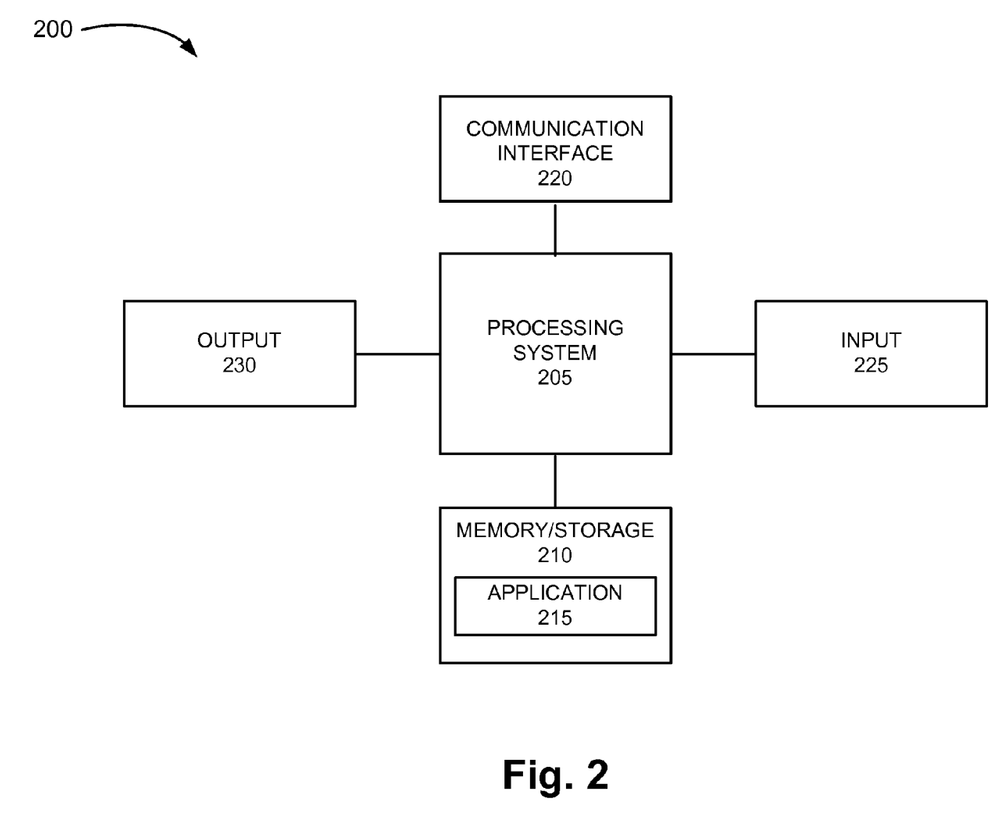
FIG. 2 is a diagram illustrating exemplary components of a device that may correspond to one or more of the devices in the environment depicted in FIGS. 1A-1F.

FIG. 2 is a diagram illustrating exemplary components of a device 200 that may correspond to one or more of the devices in environment 100. For example, device 200 may correspond to user device 105, TSS 120, and/or other network devices in access network 110, network 115, etc. As illustrated, according to an exemplary embodiment, device 200 may include a processing system 205, memory/storage 210 including an application 215, a communication interface 220, an input 225, and an output 230. According to other embodiments, device 200 may include fewer components, additional components, different components, and/or a different arrangement of components than those illustrated in FIG. 2 and described herein.

Processing system 205 may include one or multiple processors, microprocessors, data processors, co-processors, application specific integrated circuits (ASICs), controllers, programmable logic devices, chipsets, field programmable gate arrays (FPGAs), application specific instruction-set processors (ASIPs), system-on-chips (SOCs), and/or some other component that may interpret and/or execute instructions and/or data. Processing system 205 may control the overall operation or a portion of operation(s) performed by device 200. Processing system 205 may perform one or multiple operations based on an operating system and/or various applications (e.g., application 215). Processing system 205 may access instructions from memory/storage 210, from other components of device 200, and/or from a source external to device 200 (e.g., a network, another device, etc.).

Memory/storage 210 may include one or multiple memories and/or one or multiple secondary storages. For example, memory/storage 210 may include a random access memory (RAM), a dynamic random access memory (DRAM), a read only memory (ROM), a programmable read only memory (PROM), a flash memory, a phase-change memory (PCM), and/or some other type of storing medium (a computer-readable medium, a compact disk (CD), a digital versatile disk (DVD), etc.). Memory/storage 210 may include a hard disk (e.g., a magnetic disk, an optical disk, a magneto-optic disk, a solid state disk, etc.) or some other type of storing medium, along with a corresponding drive. Memory/storage 210 may be external to and/or removable from device 200, such as, for example, a Universal Serial Bus (USB) memory, a dongle, a hard disk, mass storage, off-line storage, etc.

The term "computer-readable medium," as used herein, is intended to be broadly interpreted to include, for example, a memory, a secondary storage medium, a CD, a DVD, or another type of tangible storing medium. Memory/storage 210 may store data, application(s), and/or instructions related to the operation of device 200.

Application 215 may include software that provides various services and/or functions. For example, with reference to and according to an exemplary embodiment, application 215 may include one or multiple applications that perform one or more operations performed by network-based TSS 120 and/or performed by the client application associated with user device 105.

Communication interface 220 may permit device 200 to communicate with other devices, networks, systems, etc. Communication interface 220 may include one or multiple wireless interfaces and/or wired interfaces. Communication interface 220 may include one or multiple transmitters, receivers, and/or transceivers. Communication interface 220 may operate according to one or multiple protocols, standards, etc.

Input 225 may permit an input into device 200. For example, input 225 may include a keyboard, a mouse, a microphone, a display, a touchpad, a button, a switch, an input port, voice recognition logic, fingerprint recognition logic, a web cam, and/or some other type of visual, auditory, tactile, etc., input component. Output 230 may permit an output from device 200. For example, output 230 may include a speaker, a display, a light, an output port, and/or some other type of visual, auditory, tactile, etc., output component.

As described herein, device 200 may perform processes in response to processing system 205 executing software instructions (e.g., application 215) stored by memory/storage 210. By way of example, the software instructions may be read into memory/storage 210 from another memory/storage 210 or from another device via communication interface 220. The software instructions stored by memory/storage 210 may cause processing system 205 to perform one or more processes described herein. Alternatively, for example, according to other implementations, device 200 may perform one or more processes described herein based on the execution of hardware (processing system 205, etc.), the execution of hardware and firmware, or the execution of hardware, software, and firmware.

As previously described, according to exemplary embodiments, TSS may provide customized routing, as well as other services described herein, regardless of the access technology based on user profile information. Described below are some examples in which TSS 120 may provide TSS services.

Figure 3A:
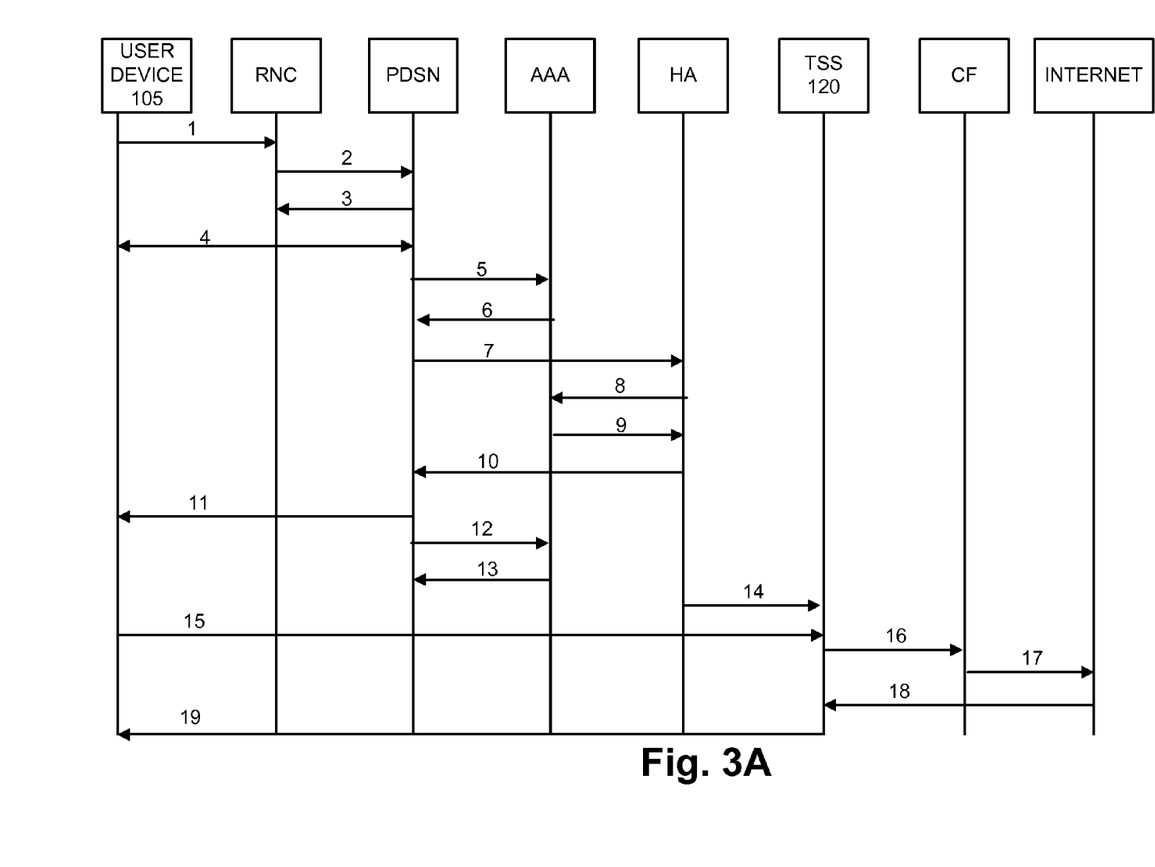
FIG. 3A is a messaging diagram illustrating an exemplary process in which the TSS may provide TSS services to a user.

FIG. 3A is a messaging diagram illustrating an exemplary process in which TSS 120 may provide TSS services to a user. In this example, the messaging diagram illustrates, in addition to user device 105 and TSS 120, other network devices, such as, a radio network controller (RNC), a packet data serving node (PDSN), an AAA, a HA, and a content filtering (CF) device. Depending on the network, additional, fewer, and/or different devices may be used. Additionally, although the messaging diagram will be described with reference to particular protocols and messages, in practice, according to other exemplary embodiments, protocols and messages different from those described in this example may be used.

Referring to FIG. 3A and with reference to message 1, user device 105 may dial a number, which may be received by the RNC. With reference to message 2, the RNC may send a registration request (e.g., an A11 registration request) to the PDSN, and in message 3, the PDSN may send a registration response (e.g., an A11 registration accept) to the RNC.

As further illustrated, and with reference to message 4, user device 105 and the PDSN may negotiate a connection using, for example, the Link Control Protocol (LCP) and the IP Control Protocol. With reference to message 5, the PDSN may send an access request (e.g., a RADIUS access request) to the AAA, and the AAA may send an access accept (e.g., a RADIUS access accept) to the PDN in message 6. Additionally, the PDSN may send a registration request (e.g., a Mobile IP registration request) to the HA in message 7.

With reference to messages 8 and 9, the HA may send an access request (e.g., a RADIUS access request) to the AAA, and the AAA may send an access accept (e.g., a RADIUS access accept) to the HA. The HA may then send a registration reply (e.g., a Mobile IP registration reply) to the PDSN in message 10. With reference to message 11, the PDSN may send a message to set-up a tunnel (e.g., a Point-to-Point Tunneling Protocol (PPTP) message) to user device 105. Additionally, the PDSN may send a billing message (e.g., a RADIUS account start message) to the AAA in message 12, and the AAA may send a billing message (e.g., a RADIUS account response message) to the PDSN in message 13. For example, the billing messages may start a billing process with respect to the user's usage.

As further illustrated in messages 14-19, TSS 120 may communicate with other devices to provide TSS services to user device 105. For example, in message 14, the HA may send IP session information and user profile information to TSS 120. Additionally, the HA may send IP address and port(s) (e.g., public IP address, private IP address, a Network Address Translation (NAT) IP address, ports, etc.).

In this example, user device 105 may send a web request (e.g., a Hypertext Transfer Protocol (HTTP) GET message) to TSS 120 in message 15. In message 16, TSS 120 may send a message to the CF device. By way of example, the message may include a virtual local area network (VLAN) identifier and user-specific content filtering information. The CF device may process the message received from TSS 120 and send the web request to the Internet in message 17. In messages 18 and 19, a web response (e.g., an HTTP PUT) may be sent to user device 105. In this way, among other things, TSS 120 may dynamically change the routing characteristics of the IP packets so that the IP packets are processed by appropriate content filtering.

Figure 3B:
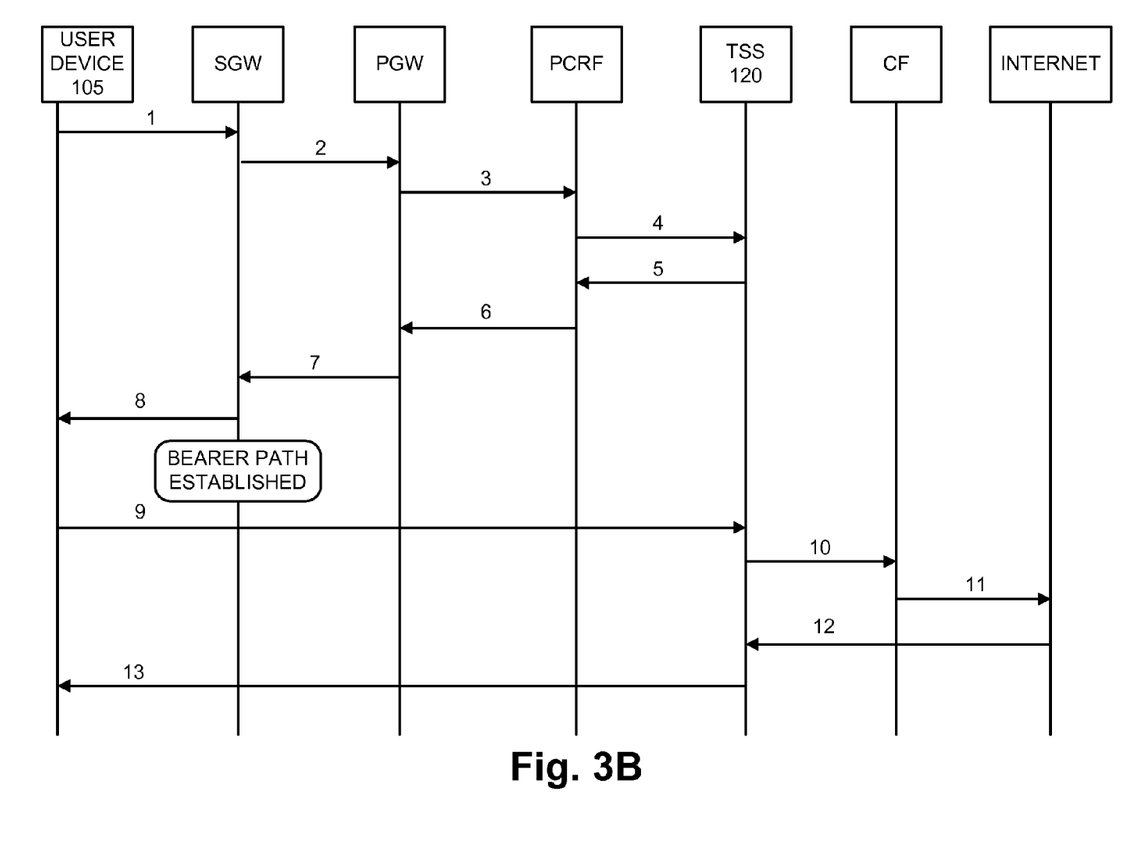
FIG. 3B is a messaging diagram illustrating another exemplary process in which the TSS may provide TSS services to a user.

FIG. 3B is a messaging diagram illustrating another exemplary process in which TSS 120 may provide TSS services to a user. In this example, the messaging diagram illustrates, in addition to user device 105 and TSS 120, other network devices, such as, serving gateway (SGW), a PGW, a PCRF, and the CF. Depending on the network, additional, fewer, and/or different devices may be used. For example, according to the LTE network standard, other devices, such as an enhanced Node B (eNB), a mobility management entity (MME), home subscriber server (HSS), etc., may be used. Additionally, although the messaging diagram will be described with reference to particular protocols and messages, in practice, according to other exemplary embodiments, protocols and messages different from those described in this example may be used.

Referring to FIG. 3B and with reference to message, user device 105 may send a connection request (e.g., a packet data network (PDN) request) to the SGW. In message 2, the SGW may send a session request (e.g., an IP-Connectivity Access Network (CAN) session request) to the PGW. With reference to message 3, the PGW may send a session request (e.g., a DIAMETER CC request) to the PCRF. For example, the DIAMETER CC request may include, among other things, a session identifier). The PCRF may send an authorization request (e.g., a reauthorization request) to TSS 120 in message 4. For example, the authorization request may include the session identifier, result code=authorize only, charging-rule-install, user profile information, etc. TSS 120 may send an authorization answer (e.g., a reauthorization answer) to the PCRF in message 5. For example, the authorization answer may include the session identifier, result code=DIAMETER success, etc.

In message 6, the PCRF may send a session response (e.g., a DIAMETER CC response) to the PGW. For example, the session response may include, among other things, a result code=DIAMETER success. The PGW may send a session response (e.g., an IP CAN session response) to the SGW in message 7. The SGW may send a connection response (e.g., a PDN response) to user device 105 in message 8 in which a bearer path may be established.

As further illustrated in messages 9-13, TSS 120 may communicate with other devices to provide services to user device 105. In this example, user device 105 may send a web request (e.g., an (HTTP) GET) to TSS 120 in message 9. In message 10, TSS 120 may send a message to the CF. By way of example, the message may include virtual local area network (VLAN) identifier and user-specific content filtering information. The CF may process the message received from TSS 120 and send the web request to the Internet in message 11. In messages 12 and 13, a web response (e.g., an HTTP PUT) may be sent to user device 105.

As described herein, the TSS may be integrated into various networks. The TSS may serve as a point of integration in the communication path. For example, the TSS may be in-line with all packets that are being routed to a Short Messaging Service Center (SMSC), a Multimedia Messaging Service Center (MMSC), a data center, an ASP, an Internet Service Provider (ISP), etc. In this way, the TSS may analyze the packets received and provide the appropriate service. The TSS may make decisions on how a network is configured in near real-time for a user based on user profile information and services being used.

Figure 4:
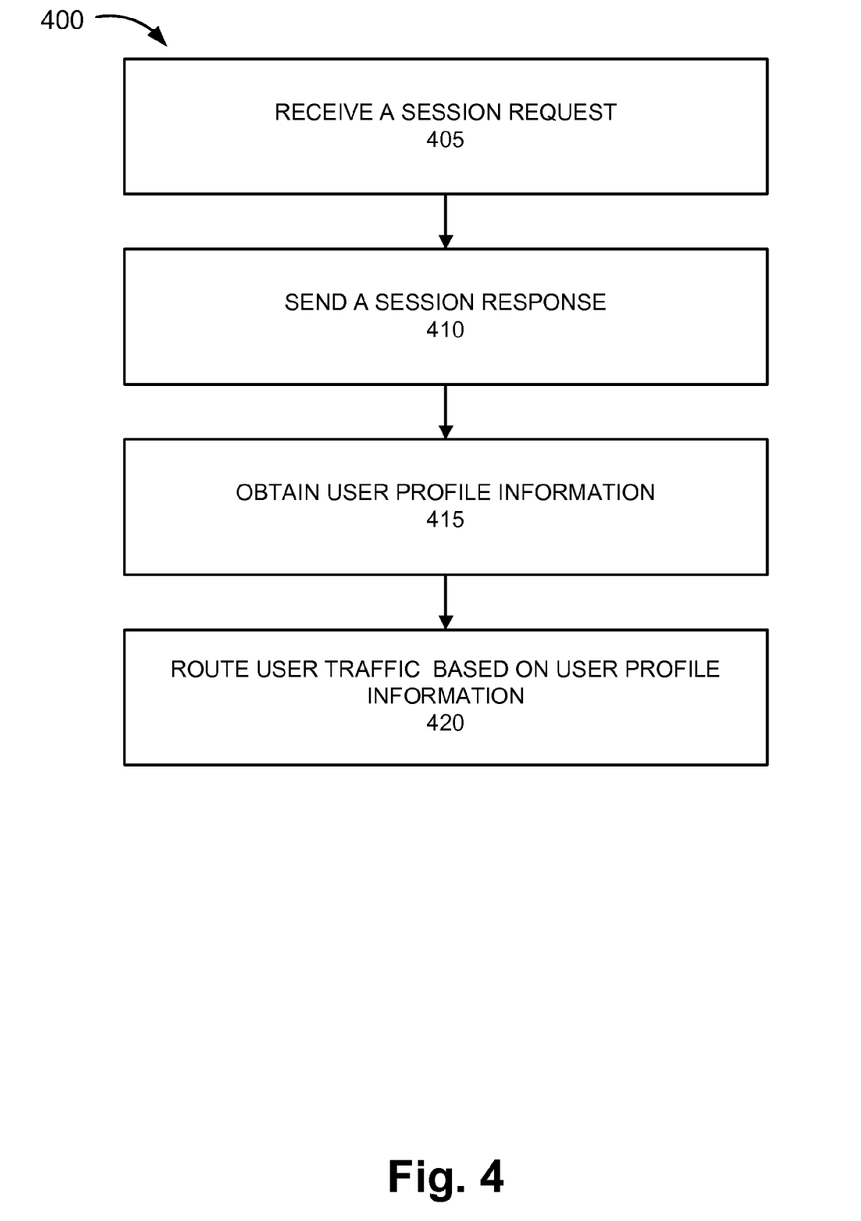
FIG. 4 is a flow diagram illustrating an exemplary process associated with the TSS.

FIG. 4 is a flow diagram illustrating an exemplary process 400 associated with TSS 120. As previous described, TSS 120 may provide TSS services. For example, TSS services may include traffic steering services (e.g., routing based on user profile information), as well as other types of services (e.g., content filtering, find-me, follow-me services, etc.) as described herein.

Process 400 may include TSS 120 and/or network 115 associated with TSS 120 receiving a session request (block 405). For example, as previously described, a user, via user device 105, may initiate a session request to network 115 and/or TSS 120. According to an exemplary embodiment, user device 105 may include the client application. The client application may perform one or more of the processes previously described, such as, for example, authentication, etc. The session request may relate to a request for various types of service, such as, for example, voice, Internet, IM, SMS, MMS, television, etc.

TSS 120 and/or network 115 associated with TSS 120 may send a session response (block 410). For example, as previous described, network 115 and/or TSS 120 may send a session response to user device 105 associated with the user. According to an exemplary embodiment, network 115 and/or TSS 120 may negotiate a connection with the client application. The session response may relate to the granting of various types of services, as previously described.

TSS 120 may obtain user profile information (block 415). By way of example, TSS 120 may retrieve, request, etc., user profile information associated with the user. For example, TSS 120 may obtain the user profile information during a connection setup with network 115. Depending on the type of network, TSS 120 may communicate with various types of network devices that may store this type of information. By way of example, the user profile information may include, among other things, user credential information, content filtering information, user history, location information (e.g., home, office, etc.), call forwarding information, as well as other types of information that may relate to TSS services as described herein.

TSS 120 may route the user traffic based on the user profile information (block 420). For example, as previously described, TSS 120 may route the user's traffic based on the user profile information. For example, TSS 120 may use the user's profile information to provide TSS services to the user, such as, content filtering, etc. Additionally, or alternatively, TSS 120 may provide other types of services based on other types of information (e.g., routing domain information, NAT information, etc.).

Although FIG. 4 illustrates an exemplary process 400, according to other embodiments, process 400 may include additional operations, fewer operations, and/or different operations than those illustrated in FIG. 4.

As a result of the foregoing, as previously described, the user may have, among other things, the same quality of experience across any access technology. The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIG. 4, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processing system 205, etc.), a combination of hardware and software (e.g., application 215), a combination of hardware and firmware, a combination of hardware, firmware, and software, or software. The embodiments have been described without reference to the specific software code since software can be designed to implement the embodiments based on the description herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

No element, act, or instruction used in the present application should be construed as critical or essential to the embodiments described herein unless explicitly described as such.

What is claimed is:

1. A method comprising:
   receiving a session request to establish a network connection with a first network;
   sending, by a traffic steering system over a second network, a session response to establish the network connection with the first network;
   obtaining, by the traffic steering system, user profile information associated with a user sending the session request;
   detecting at least one network security threat, attack, or violation; and
   routing the network connection to a requested user destination via the traffic steering system based on the user profile information and the at least one detected security threat, attack, or violation, wherein the user profile information includes user-specific preferences.

2. The method of claim 1, wherein the user profile information includes user credential information, and the method further comprising:
   proxying the user credential information with the requested user destination to provide the user access to a service provided by the requested user destination.

3. The method of claim 1, wherein the user profile information includes content filtering information, and the method further comprising:
   providing content filtering based on the content filtering information.

4. The method of claim 1, further comprising:
   receiving a request by a client residing on a user device to authenticate the user;
   authenticating the user; and
   making all services provided by the first network available to the user regardless of an access technology used by the user device.

5. The method of claim 4, further comprising:
   receiving messages from other users that are destined to the user; and
   routing the messages to the user device from which the user is authenticated.

6. The method of claim 1, further comprising:
   determining a location of the user;
   determining a domain of the user; and
   routing messages to the user based on the location and the domain.

7. The method of claim 1, further comprising:
   receiving messages from other users that are destined to the user; and
   routing the messages based on the user profile information.

8. The method of claim 1, further comprising:
   evaluating the user's usage behavior; and
   offering services to the user based on the user's usage behavior.

9. A device comprising logic configured to:
   receive a request to establish a network connection with a first network;
   send a response over a second network to establish the network connection with the first network;
   obtain user profile information associated with a user sending the request;
   detect at least one network security threat, attack, or violation; and
   route the network connection to a requested user destination via the device based on the user profile information and the at least one detected security threat, attack, or violation, wherein the user profile information includes user-specific preferences.

10. The device of claim 9, wherein the user profile information includes user credential information, and the logic is further configured to:
    proxy the user credential information with the requested user destination to provide the user access to a service provided by the requested user destination.

11. The device of claim 9, wherein the user profile information includes content filtering information, and the logic is further configured to:
    provide content filtering with respect to the requested user destination based on the content filtering information.

12. The device of claim 9, wherein the logic is further configured to:
    receive messages from other users that are destined to the user; and
    route the messages based on the user profile information.

13. The device of claim 9, wherein the device corresponds to a grid computing platform that includes multiple devices.

14. The device of claim 9, wherein the logic is further configured to:
   determine a location of the user;
   determine a domain of the user; and
   route messages to the user based on the location and the domain.

15. The device of claim 9, wherein the logic is further configured to:
   analyze the user's behavior and usage;
   provide an offer to the user to form a social link with other users based on the user's behavior and usage; and
   coordinate the forming of the social link when the user accepts the offer.

16. The device of claim 9, wherein the logic is further configured to:
   map an Electronic Number Mapping System with a Domain Name System to provide the user with a web page when the user places a telephone call, wherein the web page relates to a destination associated with the telephone call.

17. A non-transitory computer-readable medium containing instructions executable by at least one processing system, the computer-readable medium storing instructions to:
   receive a request to establish a network connection with a first network;
   send a response over a second network to establish the network connection with the first network;
   obtain user profile information associated with a user sending the request;
   detect at least one network security threat, attack, or violation; and
   route the network connection to a requested user destination based on the user profile information and the at least one detected security threat, attack, or violation, wherein the user profile information includes user-specific preferences.

18. The non-transitory computer-readable medium of claim 17, further storing one or more instructions to:
   receive messages from other users that are destined to the user; and
   route the messages based on the user profile information.

19. The non-transitory computer-readable medium of claim 17, further storing one or more instructions to:
   determine a location of the user; and
   route messages to the user based on the location.

20. The non-transitory computer-readable medium of claim 17, wherein the user profile information includes at least one of user credential information or usage behavior.

\* \* \* \* \*